(12) United States Patent
Jiang et al.

(10) Patent No.: US 11,208,019 B2
(45) Date of Patent: Dec. 28, 2021

(54) HEADREST ASSEMBLY

(71) Applicant: Daimay North America Automotive, Inc., Redford, MI (US)

(72) Inventors: Yintai Jiang, Shanghai (CN); Jianhua Wang, Novi, MI (US); Guojun Tang, Zhoushan (CN)

(73) Assignee: Daimay North America Automotive, Inc., Redford, MI (US)

( * ) Notice: Subject to any disclaimer, the term of this patent is extended or adjusted under 35 U.S.C. 154(b) by 0 days.

(21) Appl. No.: 16/764,019

(22) PCT Filed: Mar. 16, 2018

(86) PCT No.: PCT/CN2018/079295
§ 371 (c)(1),
(2) Date: May 14, 2020

(87) PCT Pub. No.: WO2019/174038
PCT Pub. Date: Sep. 19, 2019

(65) Prior Publication Data
US 2021/0009020 A1    Jan. 14, 2021

(51) Int. Cl.
*B60N 2/844*    (2018.01)
*B60N 2/856*    (2018.01)

(52) U.S. Cl.
CPC .......... *B60N 2/844* (2018.02); *B60N 2/856* (2018.02)

(58) Field of Classification Search
CPC ........... B60N 2/844; B60N 2/856; B60N 2/20
See application file for complete search history.

(56) References Cited

U.S. PATENT DOCUMENTS

| | | | |
|---|---|---|---|
| 6,074,011 A * | 6/2000 | Ptak ...................... | B60N 2/874 297/408 |
| 8,157,320 B2 | 4/2012 | Sayama | |
| 8,979,203 B1 | 3/2015 | Sutter, Jr. et al. | |
| 10,525,853 B2 * | 1/2020 | Kubota .................. | B60N 2/206 |
| 10,710,485 B2 * | 7/2020 | Yilma .................... | B60N 2/829 |
| 2006/0006720 A1 * | 1/2006 | Yamada ............... | B60N 2/3011 297/378.12 |
| 2008/0203801 A1 * | 8/2008 | Jammalamadaka ... | B60N 2/859 297/408 |
| 2009/0102266 A1 * | 4/2009 | Furukawa .............. | B60N 2/856 297/391 |

(Continued)

FOREIGN PATENT DOCUMENTS

CN    101641237 A    2/2010
CN    102627082 A    8/2012

OTHER PUBLICATIONS

International Search Report and Written Opinion for International Application No. PCT/CN2018/079295 filed on Mar. 16, 2018.

*Primary Examiner* — Timothy J Brindley
(74) *Attorney, Agent, or Firm* — Carlson, Gaskey & Olds, P.C.

(57) ABSTRACT

A headrest assembly according to an exemplary aspect of the present disclosure includes, among other things, a head restraint including a push-button and a lever rotatable by a pull cable. The head restraint is moveable from an upright position to a folded position by movement of the push-button or the lever. This disclosure also relates to a seat and a method of use.

14 Claims, 3 Drawing Sheets

(56) References Cited

U.S. PATENT DOCUMENTS

| | | | |
|---|---|---|---|
| 2010/0283305 A1* | 11/2010 | Yetukuri | B60N 2/847 297/408 |
| 2012/0038190 A1* | 2/2012 | Runde | B60N 2/20 297/183.1 |
| 2013/0140866 A1 | 6/2013 | Yetukuri et al. | |
| 2014/0183920 A1* | 7/2014 | Hage-Hassan | B60N 2/36 297/378.1 |
| 2015/0266401 A1* | 9/2015 | Grable | B60N 2/856 297/408 |
| 2018/0319303 A1* | 11/2018 | Jeong | B60N 2/874 |
| 2020/0031264 A1* | 1/2020 | Jiang | B60N 2/874 |
| 2020/0384903 A1* | 12/2020 | Xu | B60N 2/844 |

\* cited by examiner

HEADREST ASSEMBLY

CROSS-REFERENCE TO RELATED APPLICATIONS

This application is a National Stage filing for International Application No. PCT/CN2018/079295, filed on Mar. 16, 2018, which is incorporated by reference herein in its entirety.

TECHNICAL FIELD

This disclosure relates to a headrest assembly for a seat in a vehicle. This disclosure also relates to a seat and a method of use.

BACKGROUND

Headrests are configured to be positioned relative to the rear of an occupant's head and/or neck. Many vehicles include foldable seat backs in order to provide additional room in the vehicle for storage and transport of goods. Before folding a vehicle seat back, headrests are sometimes also folded to prevent interference between the headrest and another vehicle seat, for example.

SUMMARY

A headrest assembly according to an exemplary aspect of the present disclosure includes, among other things, a head restraint including a push-button and a lever rotatable by a pull cable. The head restraint is moveable from an upright position to a folded position by movement of the push-button or the lever.

In a further non-limiting embodiment of the foregoing headrest assembly, the push-button is configured to move in a linear direction along a first axis, and the lever is configured to rotate about a second axis perpendicular to the first axis.

In a further non-limiting embodiment of any of the foregoing headrest assemblies, the head restraint includes a locking plate and a locking trigger engaged with the locking plate when the head restraint is in the upright position, and the locking trigger is configured to disengage the locking plate in response to movement of the push-button or the lever.

In a further non-limiting embodiment of any of the foregoing headrest assemblies, the push-button is directly coupled to a push-pin, the push-pin is directly coupled to a push-lever, and the push-lever is coupled to the locking trigger via a linkage.

In a further non-limiting embodiment of any of the foregoing headrest assemblies, the push-lever is configured to translate linear movement of the push-pin into rotational movement of the locking trigger.

In a further non-limiting embodiment of any of the foregoing headrest assemblies, the push-lever is pivotable about an axis perpendicular to an axis of rotation of the locking trigger.

In a further non-limiting embodiment of any of the foregoing headrest assemblies, the lever is rotatably moveable in response to movement of the pull-cable.

In a further non-limiting embodiment of any of the foregoing headrest assemblies, the lever is directly coupled to the push-lever, and rotational movement of the lever causes rotational movement of the locking trigger.

A seat for a motor vehicle according to an exemplary aspect of the present disclosure includes, among other things, a seat back, a pull-cable, and a headrest assembly. The headrest assembly includes a head restraint having a push-button and a lever rotatable by a pull cable. The head restraint is moveable from an upright position to a folded position by movement of the push-button or the lever. The seat further includes an actuator configured to pull the pull-cable to move the head restraint to a folded position and to fold the seat back.

In a further non-limiting embodiment of the foregoing seat, the push-button is configured to move in a linear direction along a first axis, and wherein the lever is configured to rotate about a second axis perpendicular to the first axis.

In a further non-limiting embodiment of any of the foregoing seats, the head restraint includes a locking plate and a locking trigger engaged with the locking plate when the head restraint is in the upright position, and the locking trigger is configured to disengage the locking plate in response to movement of the push-button or the lever.

In a further non-limiting embodiment of any of the foregoing seats, the push-button is directly coupled to a push-pin, the push-pin is directly coupled to a push-lever, and the push-lever is coupled to the locking trigger via a linkage.

In a further non-limiting embodiment of any of the foregoing seats, the push-lever is configured to translate linear movement of the push-pin into rotational movement of the locking trigger.

In a further non-limiting embodiment of any of the foregoing seats, the push-lever is pivotable about an axis perpendicular to an axis of rotation of the locking trigger.

In a further non-limiting embodiment of any of the foregoing seats, the lever is rotatably moveable in response to movement of the pull-cable.

In a further non-limiting embodiment of any of the foregoing seats, the lever is directly coupled to the push-lever, and rotational movement of the lever causes rotational movement of the locking trigger.

In a further non-limiting embodiment of any of the foregoing seats, the seat includes a rod, and the head restrain is coupled to the seat by way of the rod. The rod is hollow and the pull-cable is routed through the rod between the actuator and the lever.

In a further non-limiting embodiment of any of the foregoing seats, the head restraint includes a pulley configured to guide the pull-cable between the rod and the lever.

A method according to an exemplary aspect of the present disclosure includes, among other things, folding a head restraint from an upright position to a folded position by movement of a push-button, and folding the head restrain from the upright position to the folded position by movement of a lever connected to a pull-cable.

In a further non-limiting embodiment of the foregoing method, the push button is configured to translate along a first axis and the lever is configured to rotate about a second axis perpendicular to the first axis.

BRIEF DESCRIPTION OF THE DRAWINGS

Detailed Description

This disclosure generally relates to a headrest assembly, seat, and a method of use. The headrest assembly includes a head restraint with a push-button and a lever rotatable by a pull cable. The head restraint is moveable from an upright position to a folded position by movement of either the push-button or the lever. The disclosed arrangement provides two ways to fold a head restraint, and can further be integrated with another assembly, such as a seat back folding assembly. The disclosed arrangement reduces the number of component parts relative to prior designs, which provides a relatively compact arrangement leading to reduced cost and increased manufacturability.

Figure 1:
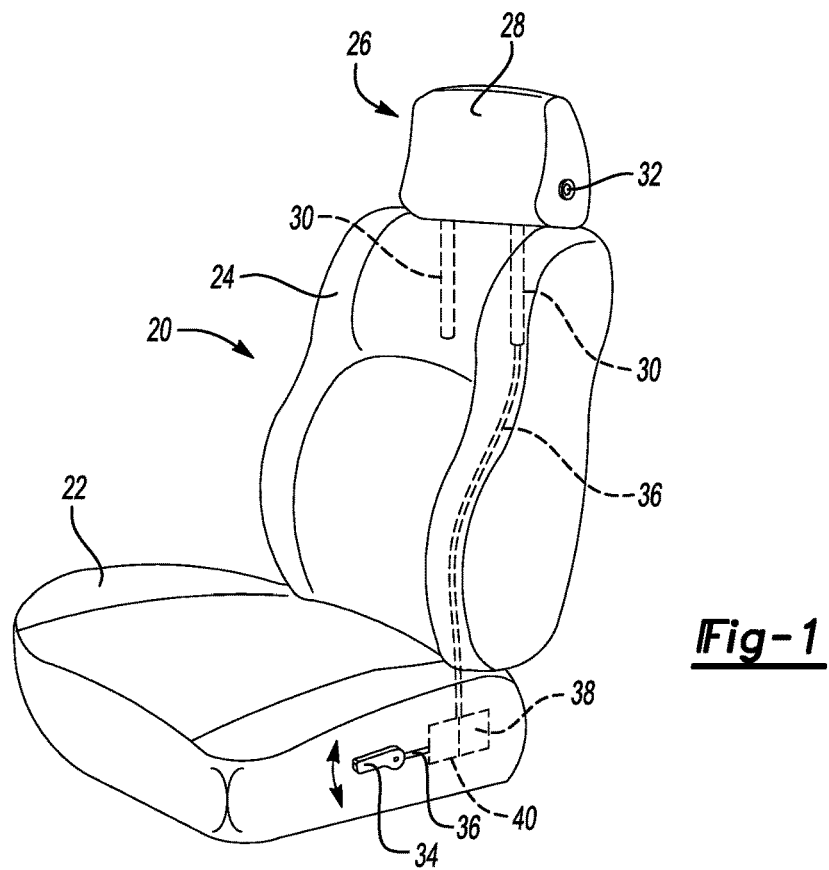

FIG. 1 illustrates an example seat 20 for a motor vehicle. The seat 20 in this example includes a base 22, a seat back 24, and a headrest assembly 26. The headrest assembly 26 includes a head restraint 28 and at least one rod 30. In this example, the head restraint 28 is moveable between an upright position (e.g., FIGS. 1 and 2) and a folded position (FIG. 3). In this example, the head restraint 28 includes a push-button 32 which, when depressed, allows movement of the head restraint 28 between the upright and folded positions.

The seat 20 also includes an actuator 34, which in this case is a lever, coupled to a pull-cable 36. The pull-cable 36 may be routed within one of the rods 30, which may be substantially hollow, between the actuator 34 and the head restraint 28. The actuator 34 is rotatable by an occupant (e.g., user) of the seat 20 or another user. When rotated, the actuator 34 allows movement of the head restraint 28 between the upright and folded positions. Thus, a user has the option of adjusting a position of the head restraint 28 using either the push-button 32 or the actuator 34. In this example, the actuator 34 is connected to the seat base 22, but it should be understood that the actuator 34 could be provided at other locations on the seat 20, or could be provided at a location spaced-apart from the seat 20.

The pull-cable 36 in this example includes one or more pull-cables. Example pull-cables include Bowden cables (sometimes called push/pull cables). The pull-cable 36 may be connected to a compensator assembly 38 in one example to allow interaction between the pull-cable 36 and other actuation systems associated with the seat 20. The seat 20 may include a seat folding assembly 40 configured to fold the seat back 24 relative to the base 22. The seat folding assembly 40 may be activated by rotation of the actuator 34 in some examples. In one example of this disclosure, rotation of the actuator 34 provides for movement of the head restraint 28 from an upright position to the folded position, and also provides for folding of the seat back 24.

Figure 2:
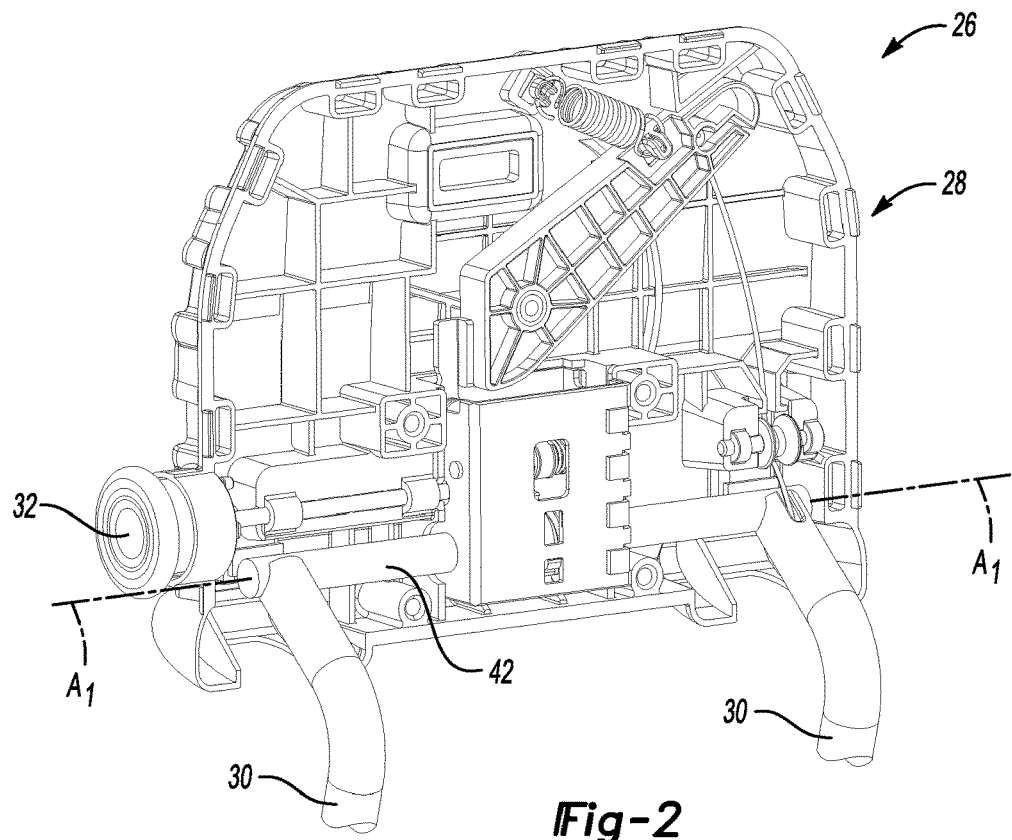
Figure 3:
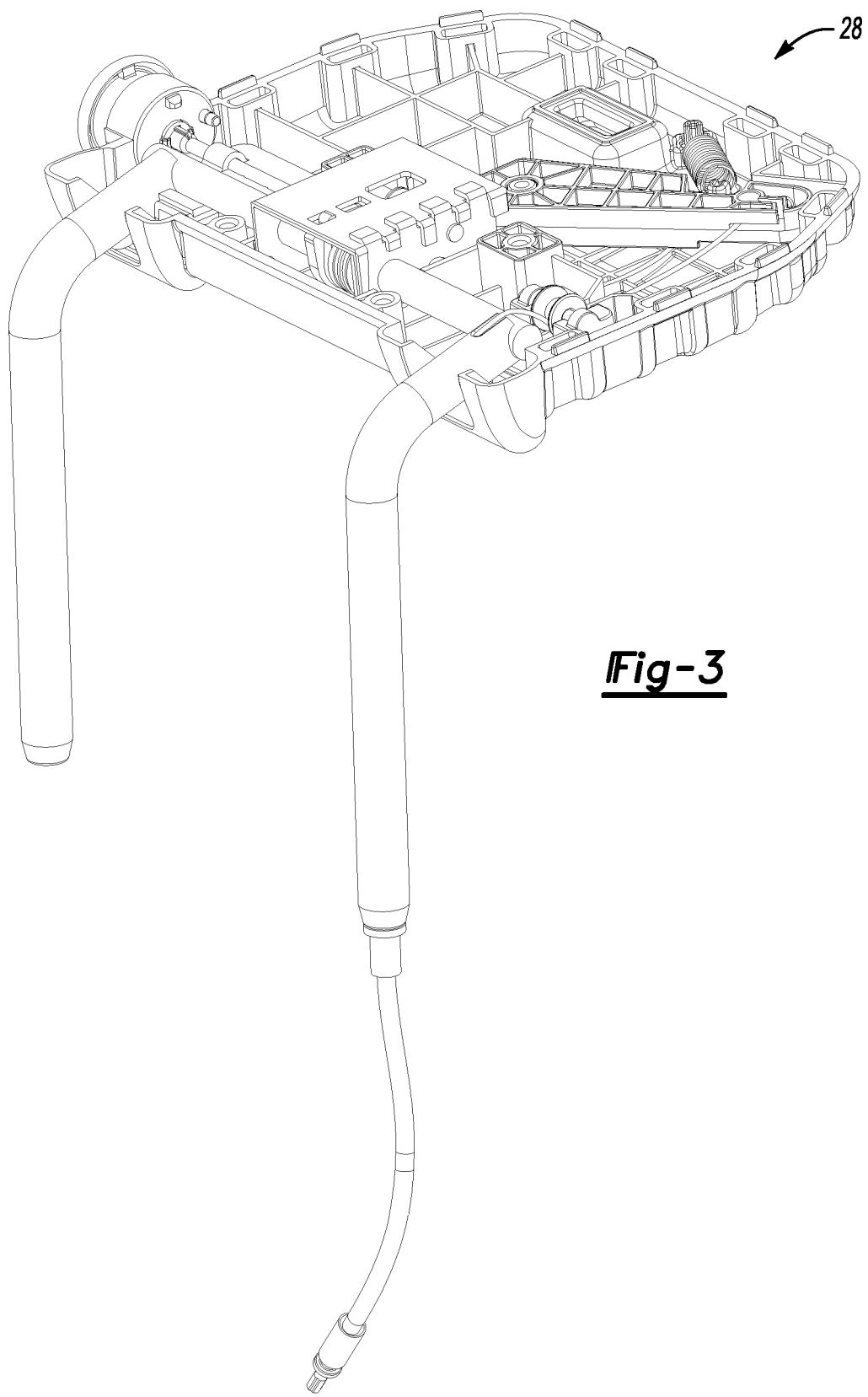

FIG. 2 is a perspective view illustrating an example arrangement of the head restraint 28 in an upright position. In FIG. 2, the internal components of the head restraint 28 are illustrated. While not illustrated in FIG. 2, the head restraint 28 is configured to support a cushion and an encasement. FIG. 1 shows the head restraint 28 supporting a cushion, which may include foam encased in fabric, such as leather or cloth.

The head restraint 28 is configured for rotation about a horizontal rod 42, which is connected between two rods 30. The rods 30 connect the head restraint 28 to the seat back 24. The horizontal rod 42 is provided along a longitudinal axis A1.

FIG. 3 illustrates the head restraint 28 in a folded position. In FIG. 3, the head restraint 28 has rotated about the axis A1 relative to the upright position. In one example, the head restraint 28 rotates in a rearward direction (e.g., away from the occupant space provided by the seat 20) when moving from the upright position to the folded position. In another example, the head restraint rotates in a forward direction.

Figure 4:
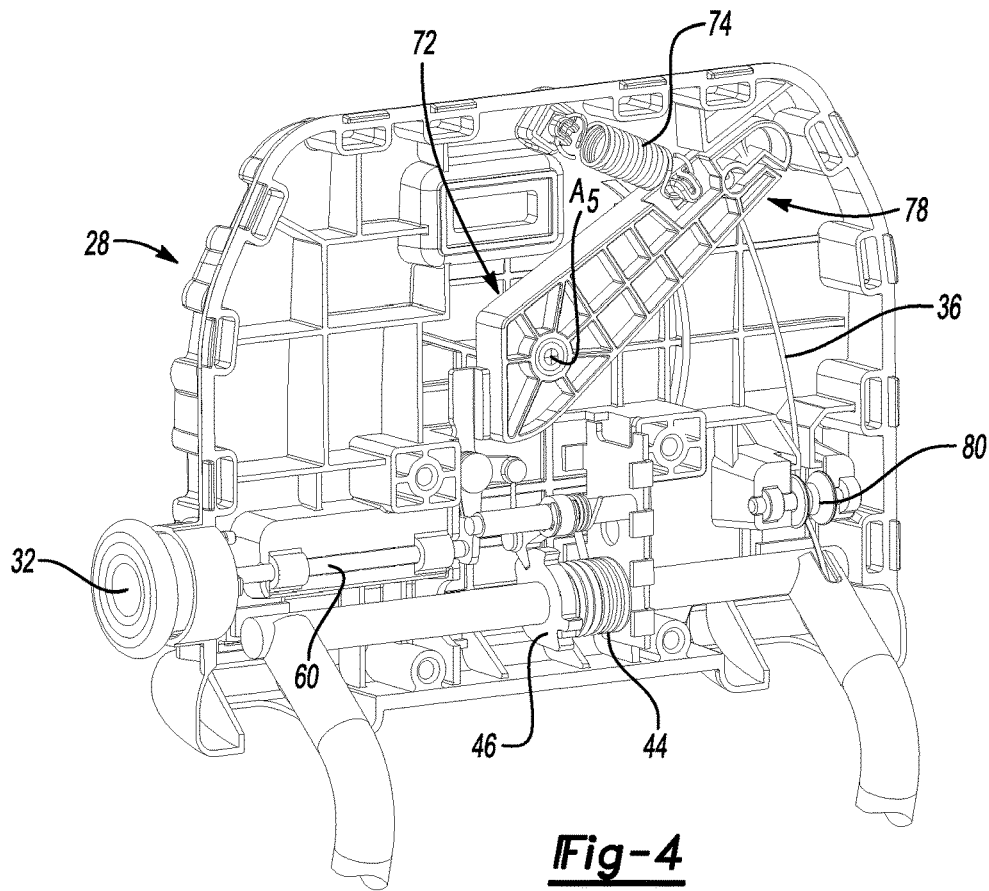
Figure 5:
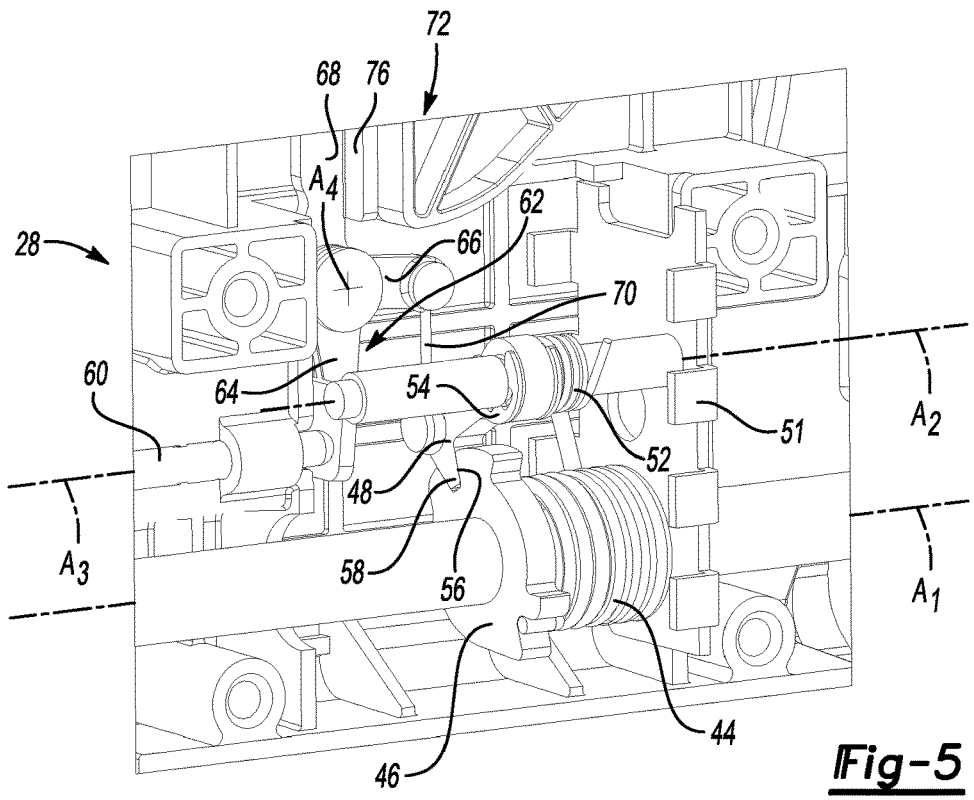

With reference to FIGS. 4 and 5, the head restraint 28 in this example is biased toward the folded position by way of a first biasing member 44. The first biasing member 44 is, in this example, a coil spring disposed about the horizontal rod 42.

The head restraint 28 is held in the upright position against the bias of the first biasing member 44 by a locking plate 46 and a locking trigger 48. The locking trigger 48 is rotatable about another horizontal rod 50, which extends along an axis A2. The horizontal rod 50 is connected to the head restraint 28 by at least one support plate 51. The axis A2 is spaced-apart from and substantially parallel to the axis A1. The locking trigger 48 is rotatably biased toward the locking plate 46 by a second biasing member 52. The second biasing member 52 in this example is a coil spring provided about the horizontal rod 50. The locking trigger 48 is held in place along the horizontal rod 50 by a clip 54, in this example. Other retention arrangements are contemplated, however.

The locking plate 46 includes a notch 56 configured to receive a tooth 58 at a free end of the locking trigger 48. When the head restraint 28 is in the upright position, the locking trigger 48 is engaged with the locking plate 46 such that the tooth 58 is received in the notch 56. While a tooth and notch are illustrated in this example, other forms of engagement between the locking trigger 48 and locking plate 46 come within the scope of this disclosure.

The locking trigger 48 is configured to disengage the locking plate 46, thereby allowing the head restraint 28 to move to the folded position, in response to movement of the push-button 32 or the pull-cable 36. With respect to the push-button 32, the push-button 32 is directly coupled to a push-pin 60 in this example. The push-pin 60 has a longitudinal axis A3 and is configured to move in a direction parallel to the axes A1, A2 when the push-button 32 is depressed. Opposite the push-button, the push-pin 60 is directly coupled to a push-lever 62.

The push-lever 62 includes three arms 64, 66, 68 in this example. In general, the push-lever 62 is configured to translate linear movement of the push-pin 62 into rotational movement of the locking trigger 48 about the axis A2. In this example, the push-lever 62 is mounted for rotation about an axis A4, which is substantially perpendicular to the axes A1, A2, A3. Axis A4 runs substantially in-and-out of the page relative to FIG. 5. The three arms 64, 66, 68 of the push-lever 62 project outward from the axis A4.

As the push-pin 60 moves along the axis A3, the push pin 60 pushes the arm 64 of the push-lever in the right-hand direction (relative to FIG. 5), which results in rotation of the push-lever 62 about the axis A4 in the counter-clockwise direction (again, relative to FIG. 5). Such movement causes the arm 66 to move upwardly (relative to FIG. 5). The arm 66 is coupled to the locking trigger 48 by way of a link 70. As such, upward movement of the arm 66 causes the locking trigger 48 to move such that the tooth 58 is removed from the notch 56. Thus, the head restraint 28 is allowed to move to the folded position.

Opposite the arm 64, the push-lever 62 includes an arm 68, which is coupled to a lever 72. The lever 72 is rotatable about axis A5, which is substantially parallel to the axis A4 and substantially perpendicular to axes A1, A2, A3. The lever 72 is biased by a third biasing member 74 to a resting position where it does not move the arm 68. The third biasing member 74 is a coil spring connected between the lever 72 and a body of the head restraint 28.

The lever 72 includes a first side 76 adjacent the arm 68. On an opposite side of the axis A5, the lever 72 includes a second side 78 directly connected to the pull-cable 36 and the third biasing member 74. The head restraint 28 may optionally include one or more pulleys 80 configured to guide the pull-cable 36 between the rod 30 and the lever 72.

When the pull-cable 36 is pulled in the downward direction (relative to FIG. 4), such as by activation of the actuator 34, the pull-cable 36 overcomes the bias of the third biasing member 74, and rotates the lever 72 about the axis A5 in a clockwise direction (again, relative to FIG. 4). Such movement of the lever 72 causes the first side 76 of the lever to push the arm 68 and rotate the push-lever 62 to rotate in the counter-clockwise direction. Like with the push-button 32, such rotation of the push-lever 62 causes the arm 66 to move upwardly, which in turn moves the locking trigger 48 upwardly and out of engagement with the locking plate 46. Accordingly, movement of the pull-cable 36 and the lever 72 allows the head restraint 28 to move to the folded position.

It should be understood that terms such as "upward," "downward," "clockwise," "counter-clockwise," "forward," "rearward," etc., are used above with reference to the orientation of the head restraint in the figures and in its normal operating position. These terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A headrest assembly, comprising:
  a head restraint including a push-button and a lever rotatable by a pull cable, wherein the head restraint is moveable from an upright position to a folded position by movement of the push-button or the lever,
  wherein the head restraint includes a locking plate and a locking trigger engaged with the locking plate when the head restraint is in the upright position, and
  wherein the locking trigger is configured to disengage the locking plate in response to movement of the push-button or the lever,
  wherein the push-button is directly coupled to a push-pin,
  wherein the push-pin is directly coupled to a push-lever, and
  wherein the push-lever is coupled to the locking trigger via a linkage, and
  wherein the push-lever is pivotable about an axis perpendicular to an axis of rotation of the locking trigger.

2. The headrest assembly as recited in claim 1, wherein the push-button is configured to move in a linear direction along a first axis, and wherein the lever is configured to rotate about a second axis perpendicular to the first axis.

3. The headrest assembly as recited in claim 1, wherein the push-lever is configured to translate linear movement of the push-pin into rotational movement of the locking trigger.

4. The headrest assembly as recited in claim 1, wherein the lever is rotatably moveable in response to movement of the pull-cable.

5. The headrest assembly as recited in claim 1, wherein:
  the lever is directly coupled to the push-lever, and
  rotational movement of the lever causes rotational movement of the locking trigger.

6. A seat for a motor vehicle, comprising:
  a seat back;
  a pull-cable;
  a headrest assembly, comprising:
    a head restraint including a push-button and a lever rotatable by a pull cable, wherein the head restraint is moveable from an upright position to a folded position by movement of the push-button or the lever; and
  an actuator configured to pull the pull-cable to move the head restraint to a folded position and to fold the seat back,
  wherein the head restraint includes a locking plate and a locking trigger engaged with the locking plate when the head restraint is in the upright position,
  wherein the locking trigger is configured to disengage the locking plate in response to movement of the push-button or the lever,
  wherein the push-button is directly coupled to a push-pin,
  wherein the push-pin is directly coupled to a push-lever,
  wherein the push-lever is coupled to the locking trigger via a linkage, and
  wherein the push-lever is pivotable about an axis perpendicular to an axis of rotation of the locking trigger.

7. The seat as recited in claim 6, wherein the push-button is configured to move in a linear direction along a first axis, and wherein the lever is configured to rotate about a second axis perpendicular to the first axis.

8. The seat as recited in claim 6, wherein the push-lever is configured to translate linear movement of the push-pin into rotational movement of the locking trigger.

9. The seat as recited in claim 6, wherein the lever is rotatably moveable in response to movement of the pull-cable.

10. The seat as recited in claim 6, wherein:
  the lever is directly coupled to the push-lever, and
  rotational movement of the lever causes rotational movement of the locking trigger.

11. The seat as recited in claim 6, further comprising:
  a rod, the head restraint coupled to the seat by way of the rod, wherein the rod is hollow and the pull-cable is routed through the rod between the actuator and the lever.

12. A seat for a motor vehicle, comprising:
  a seat back;
  a pull-cable;
  a headrest assembly, comprising:
    a head restraint including a push-button and a lever rotatable by a pull cable, wherein the head restraint is moveable from an upright position to a folded position by movement of the push-button or the lever;
  an actuator configured to pull the pull-cable to move the head restraint to a folded position and to fold the seat back; and
  a rod, the head restraint coupled to the seat by way of the rod, wherein the rod is hollow and the pull-cable is routed through the rod between the actuator and the lever;

wherein the head restraint includes a pulley configured to guide the pull-cable between the rod and the lever.

13. A method, comprising:

folding a head restraint from an upright position to a folded position by movement of a push-button;

then, folding the head restraint from the folded position to the upright position; and then, folding the head restraint from the upright position to the folded position by movement of a lever connected to a pull-cable, wherein the head restraint includes a locking plate and a locking trigger engaged with the locking plate when the head restraint is in the upright position, and wherein the locking trigger is configured to disengage the locking plate in response to movement of the push-button or the lever, the push-button is directly coupled to a push-pin, the push-pin is directly coupled to a push-lever, and the push-lever is coupled to the locking trigger via a linkage, and wherein the push-lever is pivotable about an axis perpendicular to an axis of rotation of the locking trigger.

14. The method as recited in claim 13, wherein the push button is configured to translate along a first axis and the lever is configured to rotate about a second axis perpendicular to the first axis.

* * * * *